United States Patent [19]

Rossler, Jr.

[11] 4,384,444
[45] May 24, 1983

[54] BEAN CUTTING DEVICE

[76] Inventor: Frank W. Rossler, Jr., Rte. 2, Menomonie, Wis. 54751

[21] Appl. No.: 316,790

[22] Filed: Nov. 2, 1981

[51] Int. Cl.³ .................. A01D 49/00; A01D 55/00
[52] U.S. Cl. .................................... 56/13.6; 56/503; 56/15.9; 56/157; 56/255; 56/192
[58] Field of Search ............... 56/13.6, 17.1, 11.9, 56/15.9, 192, 255, 315, 14.3, 63, 157, 503

[56] References Cited

U.S. PATENT DOCUMENTS

| | | | |
|---|---|---|---|
| 1,894,740 | 1/1933 | Groenig et al. | |
| 2,521,417 | 9/1950 | Sefcovic | 56/13.6 |
| 2,576,886 | 11/1951 | McCoy | 56/13.6 |
| 3,017,732 | 1/1962 | Keyes | 56/13.6 |
| 3,830,047 | 8/1974 | Asumendi | 56/53 |
| 3,857,225 | 12/1974 | Knudson | 56/13.6 |
| 4,048,790 | 9/1977 | Zweegers | 56/13.6 |
| 4,237,681 | 12/1980 | Zantzinger | 56/192 |

Primary Examiner—Robert Peshock
Assistant Examiner—John G. Weiss
Attorney, Agent, or Firm—Burd, Bartz & Gutenkauf

[57] ABSTRACT

A bean cutting device to cut beans when harvesting a bean crop. The device is mountable on the front of a tractor and includes a frame carrying a plurality of generally upright but forwardly inclined columns. Each column carries a cutting assembly including a cutting blade mounted on a shaft rotated by a hydraulic motor. The cutting blade is comprised as a spherical segment and has a leading edge disposed in slightly penetrating relationship relative to the soil surface. The cutting blades operate in counter-rotating pairs to cut and windrow rows of beans. Deflector units are mounted at the bases of the columns to deflect cut beans into a windrow located between pairs of counter-rotating blades.

13 Claims, 6 Drawing Figures

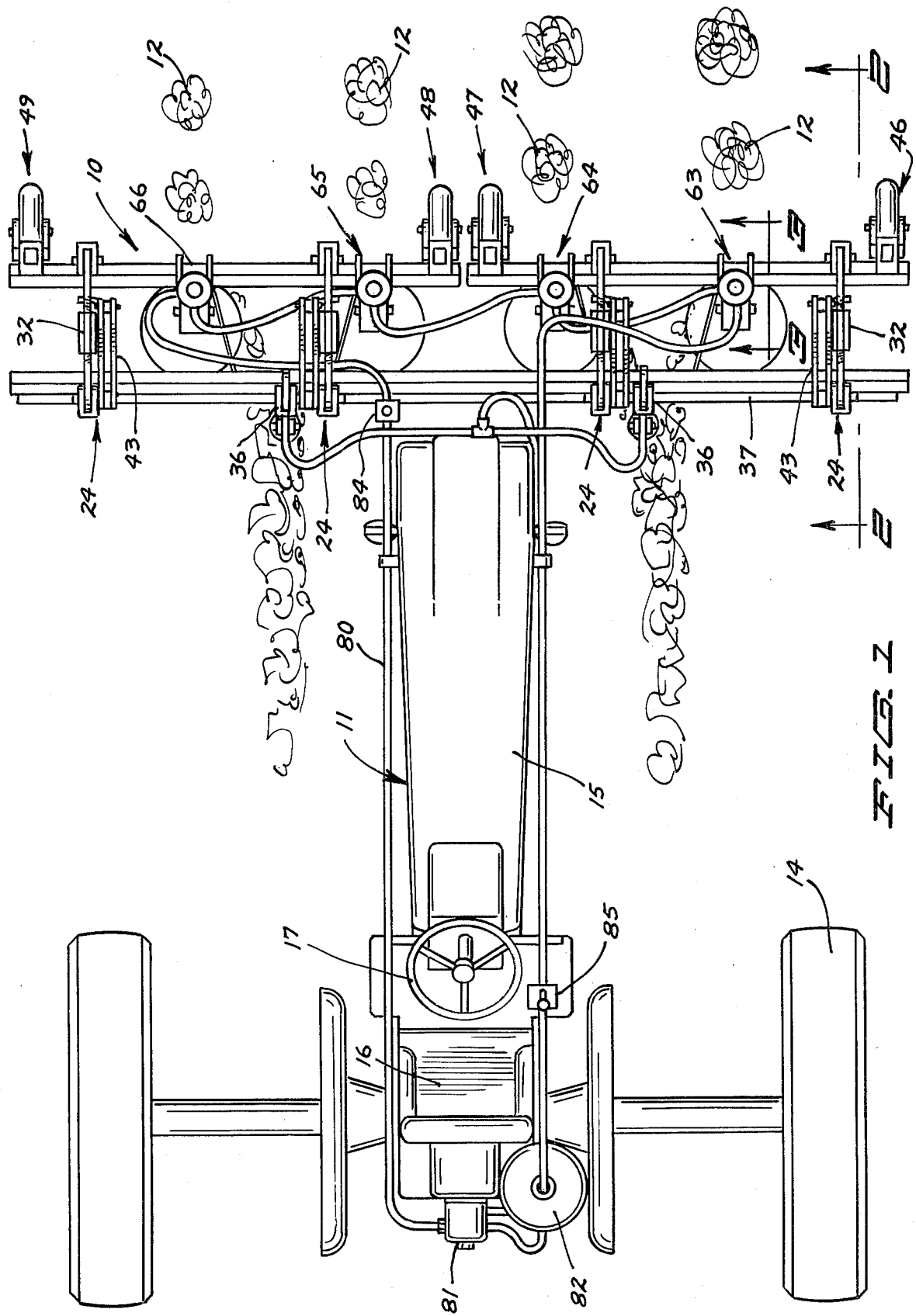

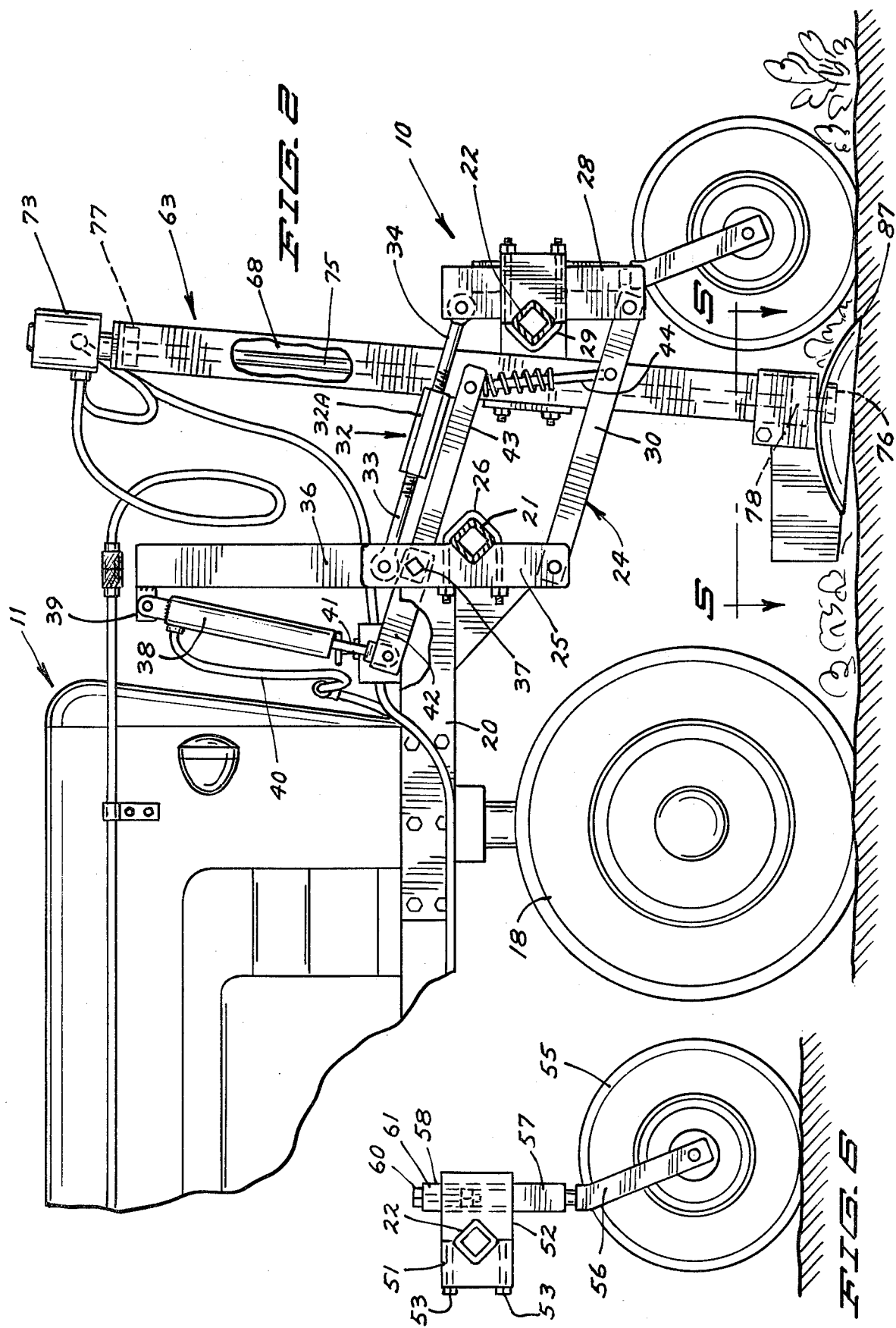

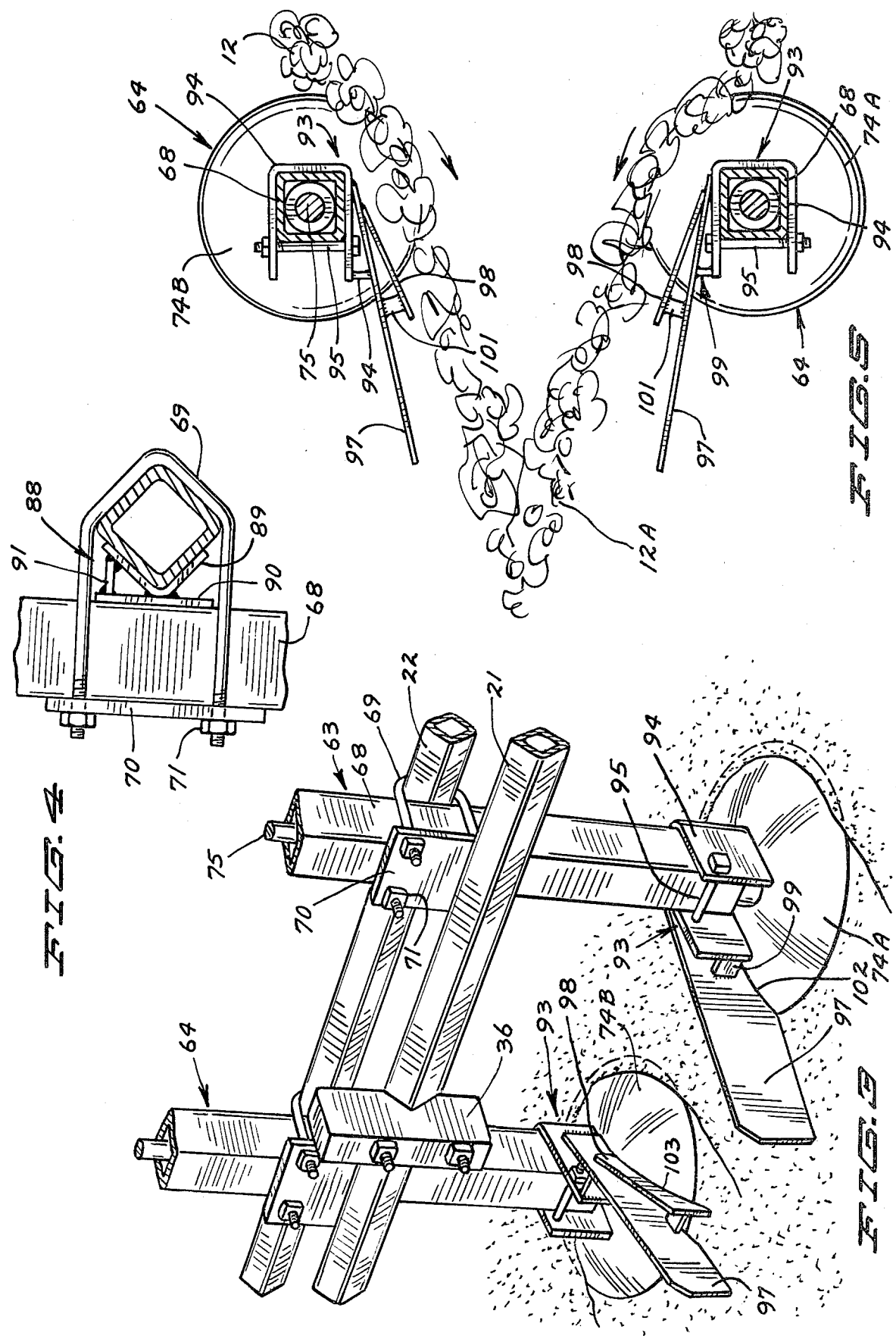

4,384,444

BEAN CUTTING DEVICE

SUMMARY OF THE INVENTION

The invention relates to a bean cutting device to cut bean vines preparatory to combining when harvesting a bean crop. Pre-cutting the bean vine is preferable to direct combining which can result in substantial waste. However, due to the vagaries of the bean plant, even use of prior art bean cutters can result in substantial waste.

According to the present invention there is provided a bean cutting device of the type mountable upon the front of a standard farm tractor to cut parallel rows of bean crop upon forward advancement of the tractor. The bean cutting device includes a frame mountable on the front of the tractor. A plurality of upright transversely aligned and spaced apart tubular support columns are assembled to the frame. Each column carries a cutting assembly including a hydraulically driven rotatable cutting blade comprised as a spherical segment with a circular cutting edge mounted for rotation on a shaft having an axis coincidental with the axis of the columns. The columns are parallel and generally upright but slightly forwardly inclined from the lower to the upper end whereby the leading edge of the cutting blade is downwardly inclined with respect to the ground. As the tractor advances, the leading edges of the blades penetrate slightly beneath the ground surface to cut the bean vines. The result is more efficient harvesting of the beans. The blades operate in counter-rotating pairs with the leading edge of each blade of a pair rotating toward the opposite blade of the pair. Bean vines encountered by the rotating blades are severed and lifted to the upper surface of the blade to be transported laterally inward. Deflectors or guides located at the base of the beams just above the surface of the blades deflect the traveling bean vines into a row located between opposing blades of each pair. A scraper is located in light surface contact with or just above the surface of each blade to remove any bean vines that might cling to the surface of the blade along with dirt or other debris.

IN THE DRAWINGS

FIG. 1 is a top plan view of a tractor equipped with a bean cutting device of the invention;

FIG. 2 is an enlarged side elevational view of the forward part of the tractor and bean cutting device of FIG. 1 taken along the line 2—2 thereof;

FIG. 3 is a perspective view of a section of the bean cutting device of FIGS. 1 and 2 with the upright columns foreshortened;

FIG. 4 is an enlarged view of the clamping arrangement of one of the columns of FIG. 3;

FIG. 5 is a sectional view of the section of the bean cutter shown in FIG. 3 taken along the line 5—5 thereof; and FIG. 6 is an enlarged side elevational view of a wheel assembly of the bean cutting device of FIG. 1.

DESCRIPTION OF A PREFERRED EMBODIMENT

Referring to the drawings, there is shown in FIGS. 1 and 2 a bean cutting device 10 installed on the forward end of a farm tractor 11 in process of cutting parallel longitudinal rows 12 of beans. Farm tractor 11 is of the conventional variety having rear drive wheels 14, a chassis 15, a rearwardly located seat 16 in position for manipulation of a steering wheel 17.

As shown in FIG. 2, the forward end of tractor 11 is equipped with suitable implement mounting equipment shown to include forwardly directed side support members, one of which is shown at 20 in FIG. 2, securely connecting an elongate transverse horizontal support beam commonly known as a tool bar 21. Cutting device 10 is connected to tool bar 21 and includes a frame having an elongate horizontal transverse support beam 22 connected to tool bar 21 by a plurality of linkage assemblies shown to include four such assemblies 24 in FIG. 1. Tool bar 21 and support beam 22 are generally square in cross-sectional shape and are diagonally orientated. As shown in FIG. 2, a linkage assembly 24 includes a first mounting block 25 assembled to the tool bar 21 in generally upright orientation by a bolt clamp 26 and having one end extended above the tool bar and the opposite end below the tool bar. A second mounting block 28 is secured in generally upright orientation to transverse support beam 22 by a bolt clamp 29 configured to closely surround support beam 22. Upper and lower ends of mounting block 28 extend above and below the support beam 22. A lower link 30 is pivotally connected at one end to the lower end of the first mounting block 25 and at the other end to the lower end of second mounting block 28. A turnbuckle assembly 32 connects the upper ends of the blocks 25, 28. Turnbuckle assembly 32 has a first leg 33 pivotally connected to the upper end of first mounting block 25 with an opposite end of first leg 33 threadably engaged in a yoke 32A. A second leg 34 of turnbuckle assembly 32 has one end pivotally connected to the upper end of the second mounting block 28 and the other end threadably engaged in the yoke 32A. It may be seen that the frame of cutting device 10 is pivotally mounted with respect to tool bar 21.

A pair of upright pillars 36 are each securely fixed at the lower end to tool bar 21 and extend upwardly therefrom in straddling relationship to tractor chassis 15. A transverse pivot bar 37 extends in parallel relationship to tool bar 21 passing through openings and bearing assemblies provided in pillars 36 and first mounting blocks 25 of linkage assemblies 24 to be supported by the pillars 36 and mounting blocks 25 and be rotatable independently thereof. Associated with each of the pillars 36 is a hydraulic cylinder assembly 38 attached at one end to a lug 39 extending from the upper end of pillar 36. A rod 41 is extendable and retractable relative to the opposite end of the cylinder 38 and is attached to a lever bar 42. Cylinder 38 receives hydraulic fluid from a remote source (not shown) through line 40 for extension of rod 41. The opposite end of lever bar 42 is securely fixed to the transverse pivot bar 37. A lift bar 43 is associated with each linkage assembly 24. One end of lift bar 43 is securely fastened to the transverse pivot rod 37. Lift bar 43 extends in generally parallel relationship to lower link 30 and is spaced above it. A connecting rod 44 connects the free end of lift bar 43 with an intermediate portion of the lower link 30 of each linkage assembly 24. Upon actuation of the hydraulic cylinder assemblies 38 to extend the rods 41, the lever arm 42 is rotated to rotate the pivot bar 37. Rotation of pivot bar 37 in a direction counterclockwise as viewed in FIG. 2 also rotates the lift bar 43 which, through the connecting rod 44, lifts the lower link 30 and thus the second connecting block 28, turnbuckle assembly 32 and transverse support beam 22. Retraction of the hydraulic cylinder rods 41 lowers the transverse support beam 22 and linkage assemblies 24.

A plurality of adjustable wheel assemblies 46-49 support transverse support beam 22 relative to the ground, the wheel assemblies 46, 49 supporting the outer ends of beam 22 and the inner wheel assemblies 47, 48 supporting the intermediate ends at the bifurcation of beam 22. Wheel assemblies 46-49 are identical in construction as exemplified by the wheel assembly 46 shown in FIG. 6 (but deleted from FIG. 2 for purposes of clarity). A clamp is comprised of mating clamp blocks 51, 52 that are held together by suitable means such as elongate bolts 53 and encompass an outer perimeter portion of the transverse support beam 22. A wheel 55 is mounted in a yoke 56 connected to an upwardly extending shaft 57. Shaft 57 is accommodated in a housing 58 located on the end of one of the clamp blocks 52. A bolt 60 has a head fixed to the top of the housing 58 but rotatable therein and a shank 61 extending into the housing 58 and threadably engaging the top of the shaft 57. Rotation of the bolt 60 is effective to move the shaft 57 up or down to adjust the height that the wheel assembly 46 holds the transverse beam 22 above the ground.

A plurality of bean cutting assemblies 63-66 are mounted on transverse support beam 22 for the purpose of cutting the bean plants and to windrow adjacent rows of plants. Bean cutting assemblies 63-66 are arranged symmetrically on transverse support beam 22 and are properly spaced to intercept adjacent rows of beans planted in a field and ready for harvest. Each bean cutting assembly includes a generally upright tubular column or housing 68 generally square in cross-sectional configuration. As shown in FIG. 3, column 68 is fastened to transverse beam 22 by a clamp assembly including a pair of U-bolts 69 engaging the transverse beam 22 in straddling relationship to the column 68. A clamping plate 70 is engaged on the U-bolt 69 bearing against the surface of column 68 opposite transverse support beam 22. A plurality of nuts 71 are secured on the ends of the U-bolts 69 to secure plate 70 in clamping relationship to the column 68.

Referring again to FIG. 2, hydraulic motors 73 are secured to the top of each of the columns 68 of bean cutting assembly 63-66. A cutting blade 74 is located at the bottom of each column 68. A shaft 75 is connected at its upper end to the hydraulic motor 73, extends through the column 68, extending beyond the lower end of column 68 and is connected at its lower end to the cutting blade 74 as by means of a nut 76. Shaft 75 passes through a first bearing 77 mounted at the upper end of column 68, and a second bearing 78 mounted at the lower end of column 68.

Hydraulic motors 73 are adapted for rotation of the shafts 75 and thus the cutting blades 74. As shown in FIG. 1, a hydraulic fluid line 80 extends in series between one hydraulic motor then the next, and then extends along chassis 15 of tractor 11 to a hydraulic pump 81 mounted on the power take-off of the tractor. The hydraulic line 80 then extends from hydraulic pump 81 to a hydraulic fluid reservoir 82 then back along the length of tractor 11 to an end hydraulic motor to complete a hydraulic circuit. An on-off valve 85 is located proximate the driver seat 16 to stop operation of the hydraulic motors 73. A control valve 84 can be provided in the hydraulic line 80 to control the flow of hydraulic fluid and thus the speed of the hydraulic motors 73.

As shown in FIGS. 2 and 3, cutting blade 74 is circular and concave or dished preferably comprised as a spherical segment with a circular cutting edge 87. For example, blade 74 can be a spherical segment with a diameter at the plane defined by the cutting edge of 22 inches (56 cm) and a depth of 4 inches (10 cm) thus being a segment of a shape having a diameter of approximately 34 inches (86 cm). The angle of the cutting edge relative to the circular plane defined by the cutting edge is approximately 40 degrees.

The columns 68 are mounted on transverse mounting beam 22 so as to be slightly forwardly inclined preferably at an angle of approximately 4 degrees to vertical. As shown in FIG. 4, a bracket 88 is positioned between transverse support beam 22 and the adjacent surface of column 68. Bracket 88 includes an angular holding member 89 shaped to conform to the side beam 22 and secured to it by suitable means such as welding. A flat positioning plate 90 is fastened to the holding member 80 and is relatively flat in configuration and is orientated at the desired inclination of column 68 which is preferably approximately 4 degrees to the vertical. A strut 91 is disposed between the positioning plate 90 and the holding member 88 at an upper portion thereof to provide additional support in maintaining positioning plate 90 at the desired inclination to rigidly hold column 68 at the desired inclination. The circular plane defined by cutting edge 87 is thus also disposed at approximately the same inclination relative to the generally horizontal ground surface whereby the leading edge of cutting edge 87 makes a slight penetration into the ground surface as blade 74 is moved forwardly along the surface as shown in FIG. 2.

Each column 68 of bean cutting assembly 63-66 is equipped at the lower end thereof with a bean vine deflector and scraper unit in order to windrow the bean plants and remove clinging plants from the upper blade surface. As shown in FIGS. 3 and 5, deflector units 93 are mounted at the bases of columns 68 of cooperating adjacent bean cutting assemblies 63, 64 just above cutting blades 74A, 74B. Deflector unit 93 includes a U-shaped collar 94 assembled around the base of column 68 with the open portion thereof rearwardly facing. A nut and bolt assembly 95 secures collar 94 to the lower end of base 68. A deflector plate 97 is attached at the forward end to the collar 94 and extends rearwardly therefrom and inwardly toward the opposite cooperating bean cutting assembly. Deflector plate 97 is a generally elongated flat plate having a lower edge located just above the rotating blade 74A with an arcuate contour indicated at 102 in conforming relationship to the upper surface of the blade 74A and spaced just above it. Plates 97 of cooperating pairs of bean cutting assemblies 63, 64 extend inwardly toward one another to deflect cut bean plants to a windrow located between the cutting assemblies. A plate-like scraper member 98 is attached to deflector plate 97 at a forward end thereof and extends rearwardly and inwardly with scrapers 98 of cooperating bean cutting assemblies extending inward toward one another in the direction of the intended location of the windrow of bean plants. Each scraper 98 is poised just above the surface of the cutting disc 74 and has a lower edge indicated at 103 arcuately curved to conform to the upper surface of the blade 74. The lower edge 103 of scraper member 98 can be located in light surface contact with the upper surface of the blade 74 or just slightly spaced above it. A connecting member 99 is connected between one end of a leg of the collar 94 and an intermediate portion of the deflector plate 97 for purposes of adding rigidity to the deflector plate 97. In similar fashion, a connector member 101 is connected between the outer end of scraper member 98 and an intermediate portion of the deflector plate 97 in order to impart rigidity to the scraper member 98.

In the use of the invention, bean cutting device 10 is mounted on the forward end of a tractor 11 by means of linkage assemblies 24. Transverse support beam 22 is supported by the wheel assemblies 46–49 and carries bean cutting assemblies 63–66. The height of the bean cutting assembly is adjustable by adjustment of the height of the carrying blocks of the wheel assemblies to adjust the height of transverse support beam 22 above the ground. The columns 68 of the bean cutting assemblies 63–66 are rigidly held in a forwardly inclined orientation and carry cutting blades 74 which are inclined with respect to the relatively horizontal ground surface by virtue of the inclination of the column 68 of the bean cutting assemblies. The leading edge of each of the blades 64 is in slightly penetrating relationship to the ground below. The bean cutting assemblies operate in pairs whereby the blades of cooperating bean cutting assemblies rotate with the leading edge of a blade of a pair rotating toward the opposite blade. Deflector and scraper units mounted on each of the columns 68 are also positioned in cooperating pairs and extend rearwardly and inwardly toward the opposite bean cutting assembly of the pair.

Hydraulic motors 73 are provided on each bean cutting assembly 63–66 for rotation of the cutting blades at a speed which can be approximately 850 revolutions per minute. The bean cutting assemblies are properly spaced apart such that the leading edges of the blades 74 encounter bean plants disposed in parallel adjacent rows. As the tractor advances, the leading cutting edge 87 of the blade 74 penetrates slightly beneath the ground surface to sever the bean plant just beneath the ground surface leaving the beans near the ground surface relatively undamaged by the cutting procedure. In addition, the entire bean plant is severed from the earth. The bean plant is lifted by the cutting blade and transported by the rotating surface of the cutting blade to the deflector and scraper unit. Due to the inclination of the circular plane described by the cutting edge, only the leading portion of the cutting edge penetrates the ground surface. The curvature of the blade surface assists in lifting the bean plant clear of the ground. The bean plant is transported on the surface of the blade to a location where it is deflected by the deflector plate toward the area disposed between the deflector plate and the deflector plate of the opposite bean cutting assembly wherein the bean plants are carefully windrowed between the cooperating bean cutting assemblies. Bean plants or debris that might adhere to the surface of the cutting blade are removed by the scraper.

Hydraulic cylinder assemblies 38 can be used to lift the bean cutting device 10 clear of the ground when not in use as for transport from place to place. The entire cutting device 10 is easily removed from the tractor.

The embodiments of the invention in which an exclusive property or privilege is claimed are defined as follows:

1. A bean cutting device mountable on the front of a tractor for cutting bean plants arranged in a field of soil in parallel spaced apart rows upon forward advancement of the tractor, comprising:
   a frame mountable on the front of a tractor;
   said frame carrying a plurality of spaced apart, tubular columns, means mounting said columns on the frame with axes in a generally upright orientation and slightly forwardly inclined from the lower end of the column to the upper end of the column;
   a cutting blade assembly mounted on each column, each said cutting blade assembly including a rotatable cutting blade mounted at the lower end of the column, said blade comprised as a spherical segment having a cutting edge defining a circular plane and rotatable about an axis coincidental with the inclined axis of the column whereby the circular plane defined by the cutting edge is disposed at an acute angle with respect to the ground surface;
   means for counter-rotation of the cutting blades in cooperating pairs whereby the leading edges of cutting blades in cooperating pairs rotate toward each other;
   means positioning the cutting blades whereby the leading edge of the cutting blade slightly penetrates the ground surface upon rotation of the cutting blades and forward advancement of the tractor;
   a deflector and scraper unit mounted at the lower end of each column poised just above the cutting blade, said deflector and scraper unit including an elongated deflector plate extending rearwardly and angularly inward, said deflector plates mounted on columns carrying cooperating pairs of cutting blades extending inward toward one another to deflect bean vines that are cut by the cutting blades and carried along the surface of the cutting blades to a single row disposed between a pair of cooperating cutting blades, each said deflector plate having a lower edge with an upwardly directed curvature shaped to conform to the upper surface of the cutting blade.

2. The bean cutting device of claim 1 wherein:
   said tractor is the type equipped with a forward mounting bar and wherein said frame means includes a horizontal support beam, a plurality of linkage assemblies connecting the horizontal support beam to the tractor mounting bar, said columns being mounted to the horizontal support beam.

3. The bean cutting device of claim 2 including:
   a plurality of wheel assemblies assembled to the horizontal support beam to support the horizontal support beam with respect to the ground.

4. The bean cutting device of claim 2 or 3 wherein:
   said means mounting the columns at a slightly forwardly inclined orientation includes a plurality of brackets, one bracket being associated with each column, each bracket being secured to said horizontal support beam and having an angular holding member secured to the beam, a flat positioning plate fixed to the angular holding member, said positioning plate being disposed at the angle of inclination of the column, means clamping the column to the positioning plate and the horizontal support beam whereby the column is held at the desired inclination.

5. The bean cutting device of claim 4 wherein:
   said positioning plate is positioned at an angle of approximately 4 degrees to vertical.

6. The bean cutting device of claim 4 including:
   a plate-like scraper member attached to each of the deflector plates and extending rearwardly and inwardly, said scraper having a contoured lower edge to conform to the upper surface of the cutting blade and being in light surface contact with the upper surface of the cutting blade to remove clinging matter from the upper surface of the cutting blade.

7. The bean cutting device of claim 2 or 3 wherein: said linkage assembly includes a first mounting block connected to the tractor mounting bar, a second generally upright mounting block connected to the horizontal support beam, a lower connecting link pivotally connected to one end to the lower end of the first mounting block and pivotally connected at the opposite end to the lower end of the second mounting block, an upper connecting link pivotally connected at one end to the upper end of the first mounting block and pivotally connected at the opposite end to the upper end of the second mounting block, a transverse pivot bar extending in parallel relationship to the mounting bar of a front tractor and passing through openings provided in the first blocks of the linkage assemblies, each linkage assembly having a lift bar fixedly connected at one end to the pivot bar and connected at the opposite end to the lower connecting link such that rotation of the pivot bar rotates the linkage assemblies, and including means for rotation of the pivot bar to rotate the linkage assemblies to lift the cutting blades clear of the ground surface.

8. The bean cutting device of claim 3 wherein: said horizontal support beam is split into a first section and a second section, said sections being of substantially equal length.

9. The bean cutting device of claim 8 including: means on the wheel assemblies for adjustment of the height of the horizontal support beam above the ground surface.

10. The bean cutting device of claim 12 wherein: means for counter-rotation of the cutting blades in cooperating pairs comprises a plurality of hydraulic motors, one hydraulic motor being mounted at the upper end of each column, a shaft connecting the hydraulic motor and the cutting blade, said shaft extending axially along said column.

11. The bean cutting device of claim 7 wherein: means for counter-rotation of the cutting blades in cooperating pairs comprises a plurality of hydraulic motors, one hydraulic motor being mounted at the upper end of each column, a shaft connecting the hydraulic motor and the cutting blade, said shaft extending axially along said column.

12. The bean cutting device of claim 11 wherein: said means for rotation of the pivot bar to rotate the linkage assemblies comprises hydraulic cylinder assemblies.

13. The bean cutting assembly of claim 11 including: a plurality of wheel assemblies assembled to the horizontal support beam to support the horizontal support beam with respect to the ground.

* * * * *

UNITED STATES PATENT AND TRADEMARK OFFICE
CERTIFICATE OF CORRECTION

PATENT NO. : 4,384,444
DATED : May 24, 1983
INVENTOR(S) : Frank W. Rossler, Jr.

It is certified that error appears in the above-identified patent and that said Letters Patent is hereby corrected as shown below:

Column 7, line 11, "to" (first occurrence) should be -- at --.

Column 8, line 8, "12" should be -- 2 --.

Signed and Sealed this

Twenty-third Day of August 1983

[SEAL]

Attest:

GERALD J. MOSSINGHOFF

Attesting Officer

Commissioner of Patents and Trademarks